(12) United States Patent
Santiago et al.

(10) Patent No.: US 12,043,006 B2
(45) Date of Patent: Jul. 23, 2024

(54) SEMI-PERMANENT VACUUM BAG BREATHER AND INSTALLATION METHOD

(71) Applicant: The Boeing Company, Chicago, IL (US)

(72) Inventors: Jonathan Santiago, Seattle, WA (US); Marco Tullio B. Ciccu, Seattle, WA (US); John Dempsey Morris, Seattle, WA (US); Derek John Flolid, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 18/047,101

(22) Filed: Oct. 17, 2022

(65) Prior Publication Data
US 2024/0123697 A1  Apr. 18, 2024

(51) Int. Cl.
| | |
|---|---|
| *B29C 70/54* | (2006.01) |
| *B29C 37/00* | (2006.01) |
| *B29C 70/34* | (2006.01) |
| *B29L 31/30* | (2006.01) |

(52) U.S. Cl.
CPC ........ *B29C 70/544* (2021.05); *B29C 37/0064* (2013.01); *B29C 70/342* (2013.01); *B29L 2031/3076* (2013.01)

(58) Field of Classification Search
None
See application file for complete search history.

(56) References Cited

U.S. PATENT DOCUMENTS

| | | | | |
|---|---|---|---|---|
| 4,836,765 | A * | 6/1989 | Kornitzky | ............... B29C 70/44 425/389 |
| 5,052,906 | A * | 10/1991 | Seemann | ............... B29C 43/203 425/389 |
| 8,992,207 | B2 | 3/2015 | Dull et al. | |
| 10,220,605 | B2 | 3/2019 | Stephenson et al. | |
| 2010/0326584 | A1* | 12/2010 | Schibsbye | ............... B29C 70/44 156/64 |
| 2019/0291361 | A1 | 9/2019 | Stephenson et al. | |

* cited by examiner

*Primary Examiner* — Christopher T Schatz
(74) *Attorney, Agent, or Firm* — Yee & Associates, P.C.

(57) ABSTRACT

A breather used for vacuum bag compaction of a composite laminate part is semi-permanently installed on a compaction tool. The breather is a channel member having an internal passageway that routes air and volatiles from the vacuum bag to a vacuum port in the tool.

24 Claims, 14 Drawing Sheets

SEMI-PERMANENT VACUUM BAG BREATHER AND INSTALLATION METHOD

BACKGROUND INFORMATION

1. Field

The present disclosure generally relates to vacuum bag compaction of composite layups, and deals more particularly with a semi-permanent breather providing improved vacuum flow, and to a method of installing the breather.

2. Background

Composite laminate parts can be made by laying up a multi-ply charge on a tool, and compacting the layup using vacuum bag processing, either within or outside an autoclave. The vacuum bag processing technique typically employs as a breather to assist in spreading the vacuum more evenly while allowing air and volatiles to escape from the layup. Breathers comprise a layer of woven or braided fabric that is placed over the layup beneath vacuum bag. Breathers are discarded after use, and therefore are a consumable item which add to the cost of producing a part.

Accordingly, it would be desirable to provide a breather that can be reused rather than being discarded, and which can be semi-permanently installed on a compaction tool.

SUMMARY

The disclosure relates in general to processing composite laminate parts, and more specifically to a breather that can be reused, and semi-permanently installed on a compaction tool.

According to one aspect, a breather is provided for vacuum bag compaction of a composite layup on a tool. The breather comprises at least one channel member mounted on the tool. The channel member defines a passageway through which air may be drawn from the composite layup during the vacuum bag compaction of the composite layup.

According to still another aspect, a system is provided for improved vacuum flow during vacuum bag compaction of a composite layup on the tool. The system comprises at least first and second channel members arranged end-to-end and mounted on a surface of the tool. The first and second channel members define a passageway placing the composite layup in vacuum flow communication with a vacuum port on the tool.

According to a further aspect, a method is provided for installing a vacuum bag breather on a tool used for vacuum bag compaction of a composite layup. The method comprises installing a channel member against the tool, and establishing a vacuum flow from the composite layup into the channel member.

One of the advantages of the disclosed breather is that it does not need to be discarded after use, but rather can be reused. Another advantage is that the disclosed breather is permanently or removably attached directly to the compaction tool. Another advantage is that the breather can be easily retrofitted to existing compaction tools without the need for tool modifications. Still another advantage of the breather is that increased vacuum flow can be achieved which results in higher compaction pressures being applied to the part layup. Another advantage is that the number and cost of consumables required to compact a part can be reduced. A still further advantage is that the time required to prepare a part layup for processing can be reduced because the need for installing and positioning a breather over a part is eliminated.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

DETAILED DESCRIPTION

Figure 1:
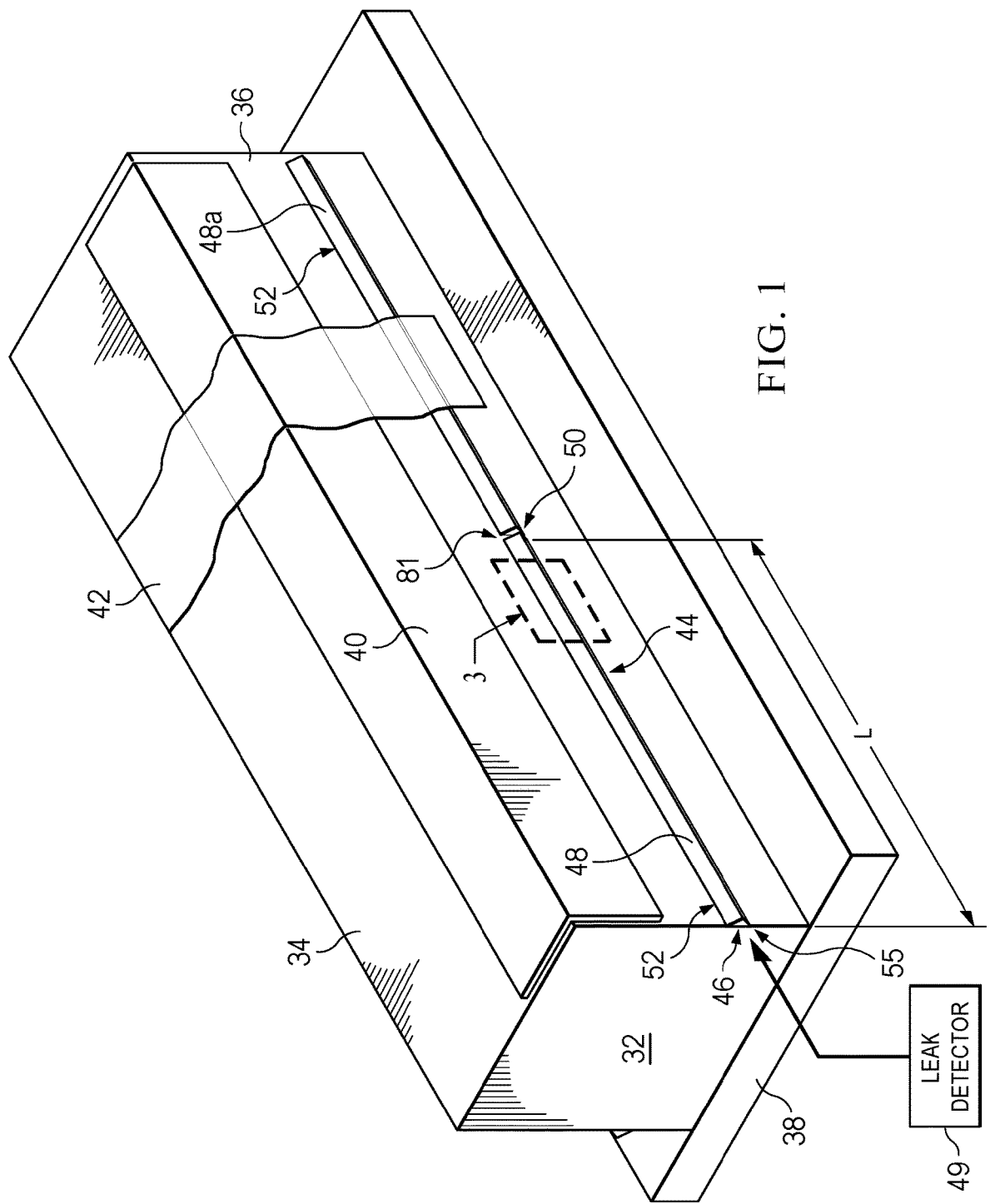
FIG. 1 is an illustration of a perspective view of a compaction tool having a semi-permanent breather installed thereon.
Figure 2:
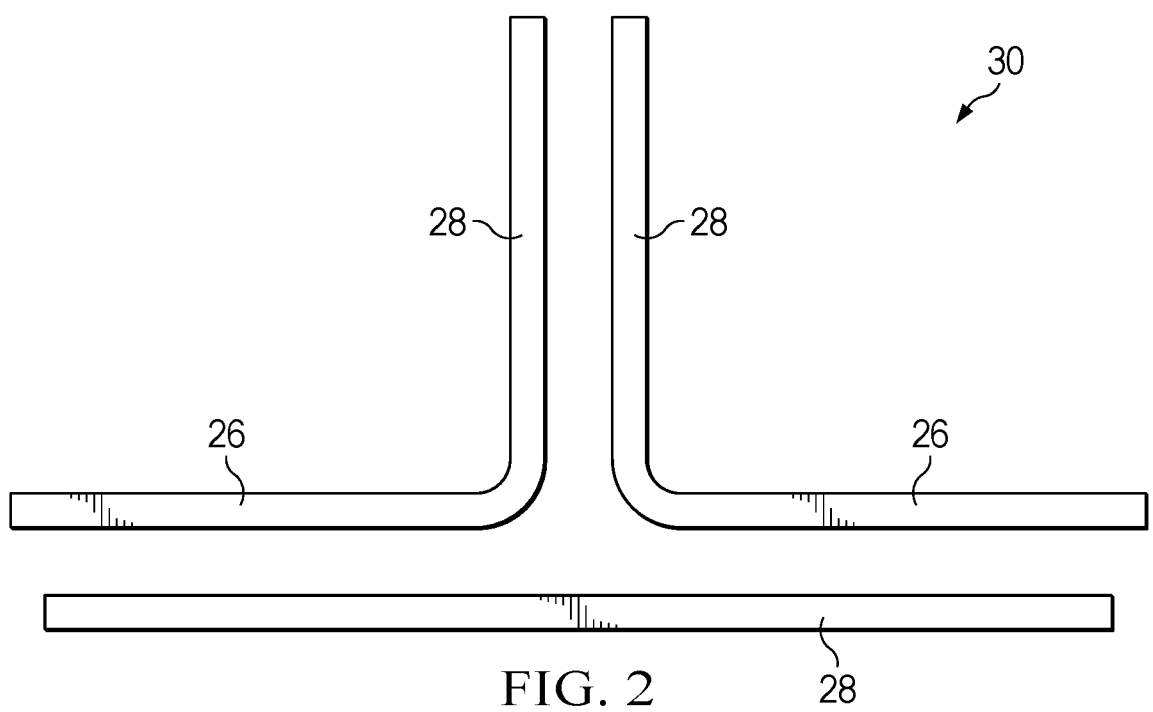
FIG. 2 is an illustration of a slightly exploded, end view of a blade stringer incorporating a part compacted on the tool shown in FIG. 1.

Referring first to FIG. 1 a layup 40, sometimes referred to as a charge, comprising multiple plies of a fiber reinforced polymer is placed on a tool 32 for compaction into a consolidated composite part 26 (FIG. 2). The tool has a top 34 and sides 36, and is supported on a base 38. In this example, the composite part is an L-shaped member which can be joined together with another L-shaped member and a base 28 to form a blade stringer 30. However, the part 26 shown in FIGS. 1 and 2 is merely illustrative of a wide range of parts having various geometries that can be compacted on the tool 32.

As will be discussed below in more detail, a vacuum bag 42 is placed over the tool 32, covering the layup 40 and sealed around its perimeter to form a vacuum tight enclosure that is evacuated in order to apply compaction pressure to the layup 40. A longitudinally extending, semi-permanent breather 44 is attached to the side 36 of the tool 32 at a location beneath the layup 40. The breather 44 functions to allow air and volatiles to escape from the vacuum bag 42 during the evacuation and compaction process. As used herein "semi-permanent" means that the breather 44 may be permanently installed on a tool 32, or may be removably installed such that the breather 44 can be removed and/or replaced. In the illustrated example, the breather 44 comprises two channel members 48, 48a arranged end-to-end 81 with a small gap 50 between them. In other examples, the ends of the channel members 48, 48a may abut each other without a gap. In further examples, the breather 44 may comprise as few as 1 or more than 2 channel members 48, 48a, depending on the application. Optionally, a leak detector 49 may be connected to one of the channel members 48, 48a to detect a reduction of vacuum flow that indicates possible leaks in the vacuum bag 42. Improved leak detection can be achieved by connecting the leak detector 49 to a distal end 55 of one of the channel members 48. Alternatively, leak detection may be performed by monitoring leaks at any of various locations on the vacuum bag 42.

Figure 3:
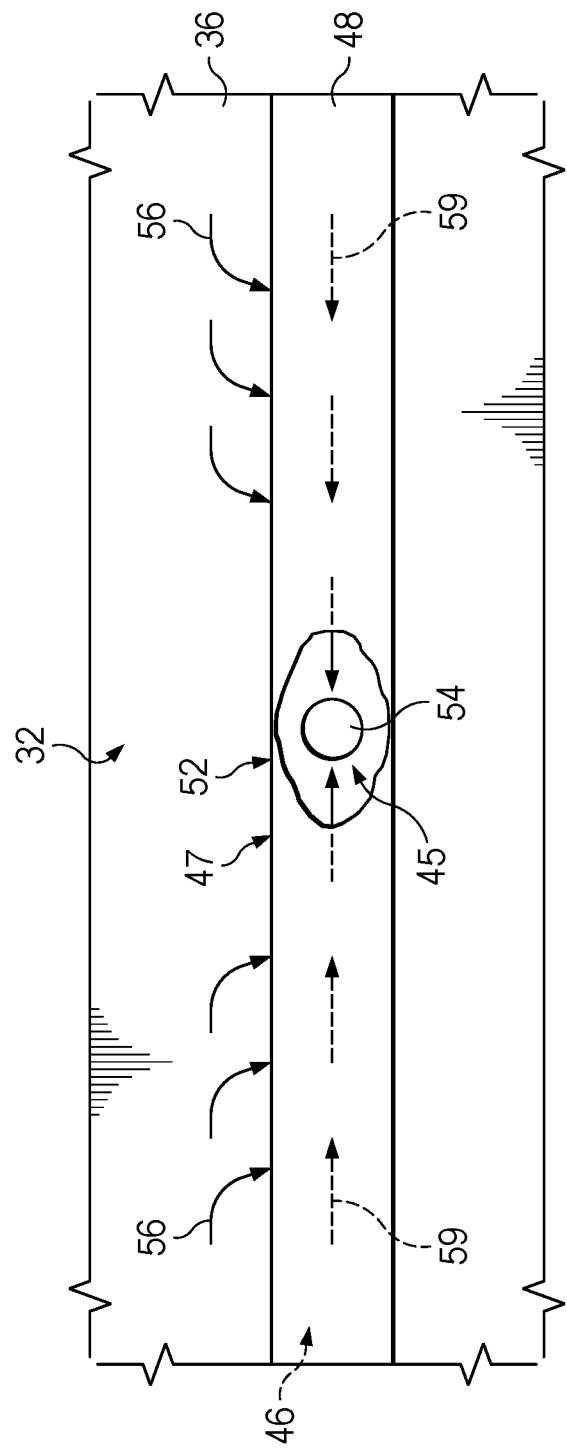
FIG. 3 is an illustration of the area designated as "3" in FIG. 1, partially broken away to reveal a vacuum port in the tool.
Figure 4:
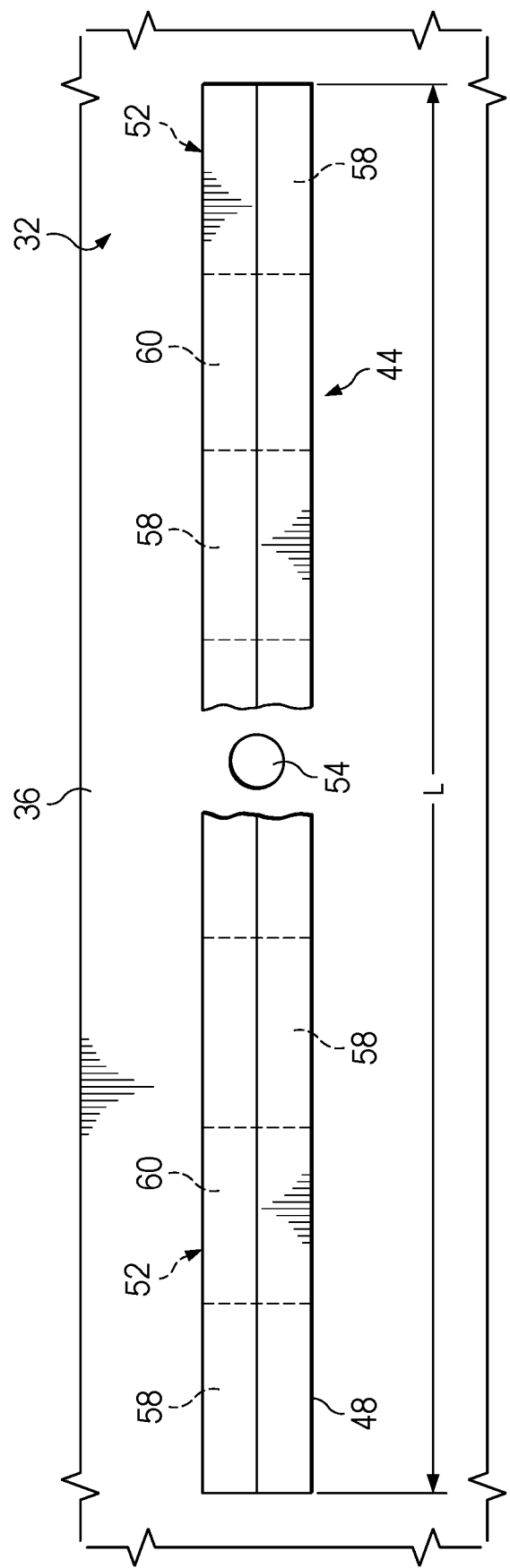
FIG. 4 is an illustration similar to FIG. 3 but showing the location of spacers and magnets on breather.
Figure 5:
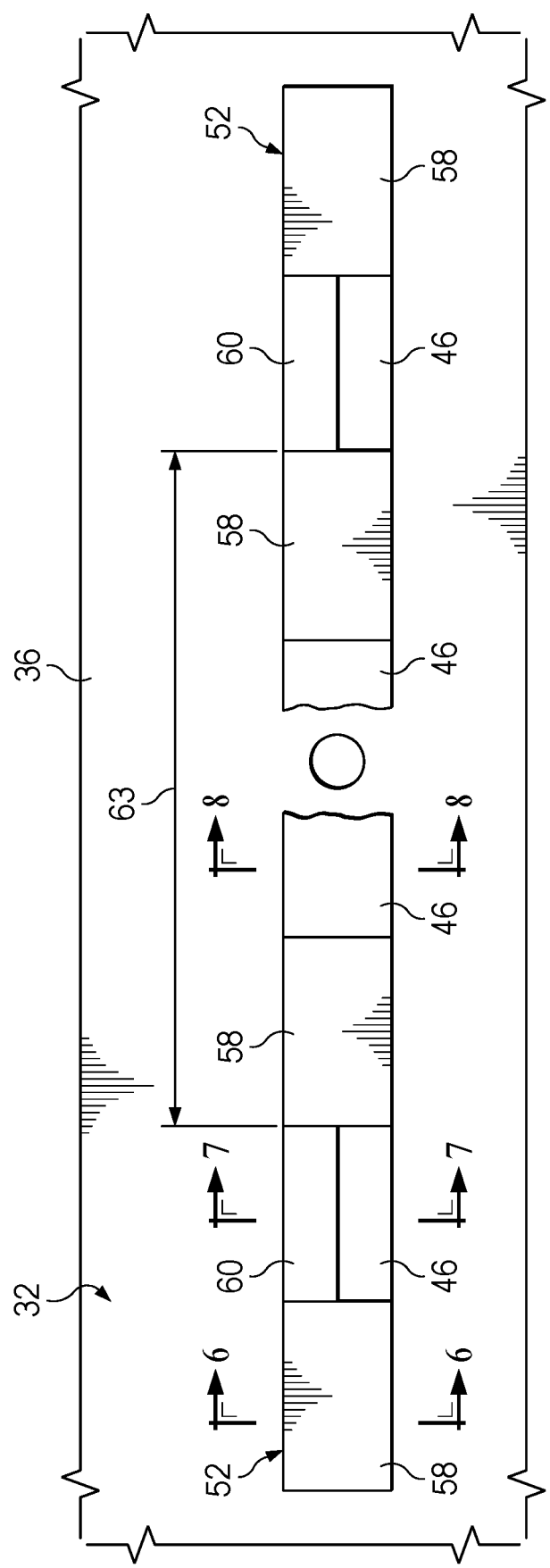
FIG. 5 is an illustration similar to FIG. 4 but viewed from the backside of the breather.

Referring to FIGS. 1 and 3, each of the channel members 48, 48a is L-shaped 77 in cross section and defines an internal passageway 46 that extends along the length of the tool 32 and overlies 45 a vacuum port 54v in the tool 32. Air and volatiles in the vacuum bag 42 are drawn 56 into the passageway 46 along the top edge 47 of the channel member 48, 48a which is spaced away from the side 36 tool 32 to form an air inlet 52. Vacuum flow 59 carries the air and volatiles through the air inlet 52 into the passageway 46 and then to at least one vacuum port 54 where they are drawn away by a vacuum source (not shown).

Attention is now directed to FIGS. 4-8 which disclose further details of one of the breather 44. In this example, the channel members 48, 48a are removably mounted on the side of the tool 32 by a plurality of magnets 60 which are located within and at opposite ends of each of the channel member 48, 48a, between the channel members 48, 48a and the tool 32. Each of the magnets 60 comprises a rare earth magnet that is attached to the channel member 48, 48a using adhesive tape or a film (not shown) that is wrapped around the channel member 48, 48a. However, the magnets may also be held against the channel members by magnetic force. In the illustrated example, two of magnets 60 are located at each end of the channel member 48, 48a and are spaced apart 63 by a spacer 58 that may be formed of any suitable material. In other examples, the magnets 60 may be positioned at other locations along the length L of the channel member 48, 48a. Also, it may be possible to removably attach the channel member 48, 48a to the tool 32 by means other than magnet 60, such as adhesive tape or fasteners (not shown).

Figure 6:
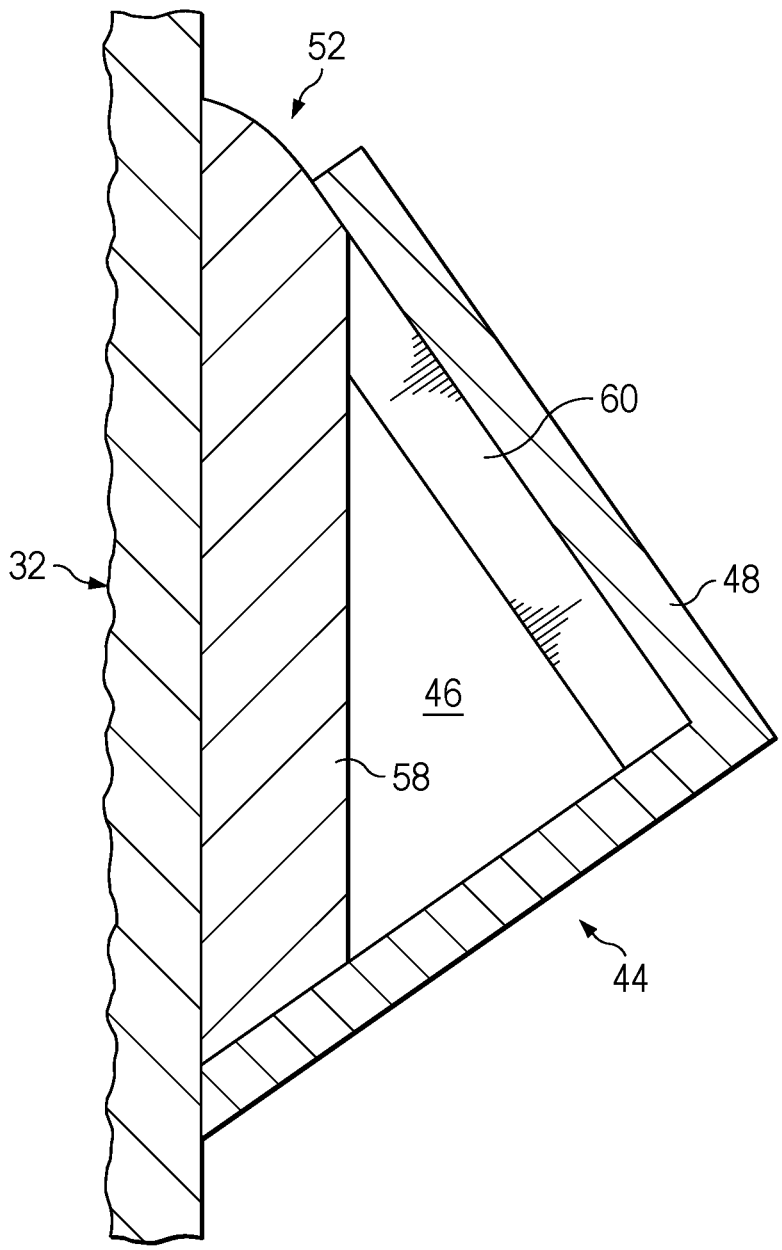
FIG. 6 is an illustration of a sectional view taken along the line 6-6 in FIG. 5.
Figure 7:
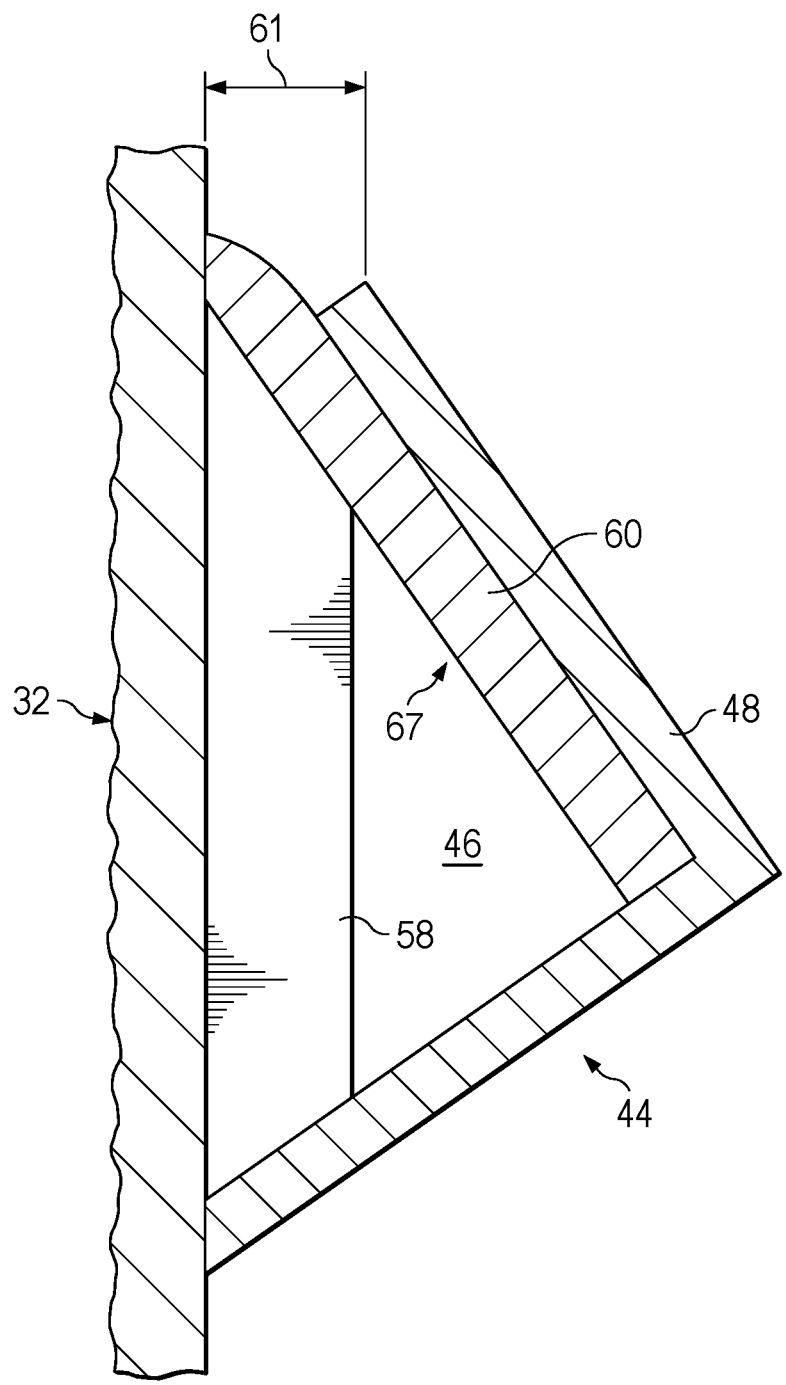
FIG. 7 is an illustration of a sectional view taken along the line 7-7 in FIG. 5.
Figure 8:
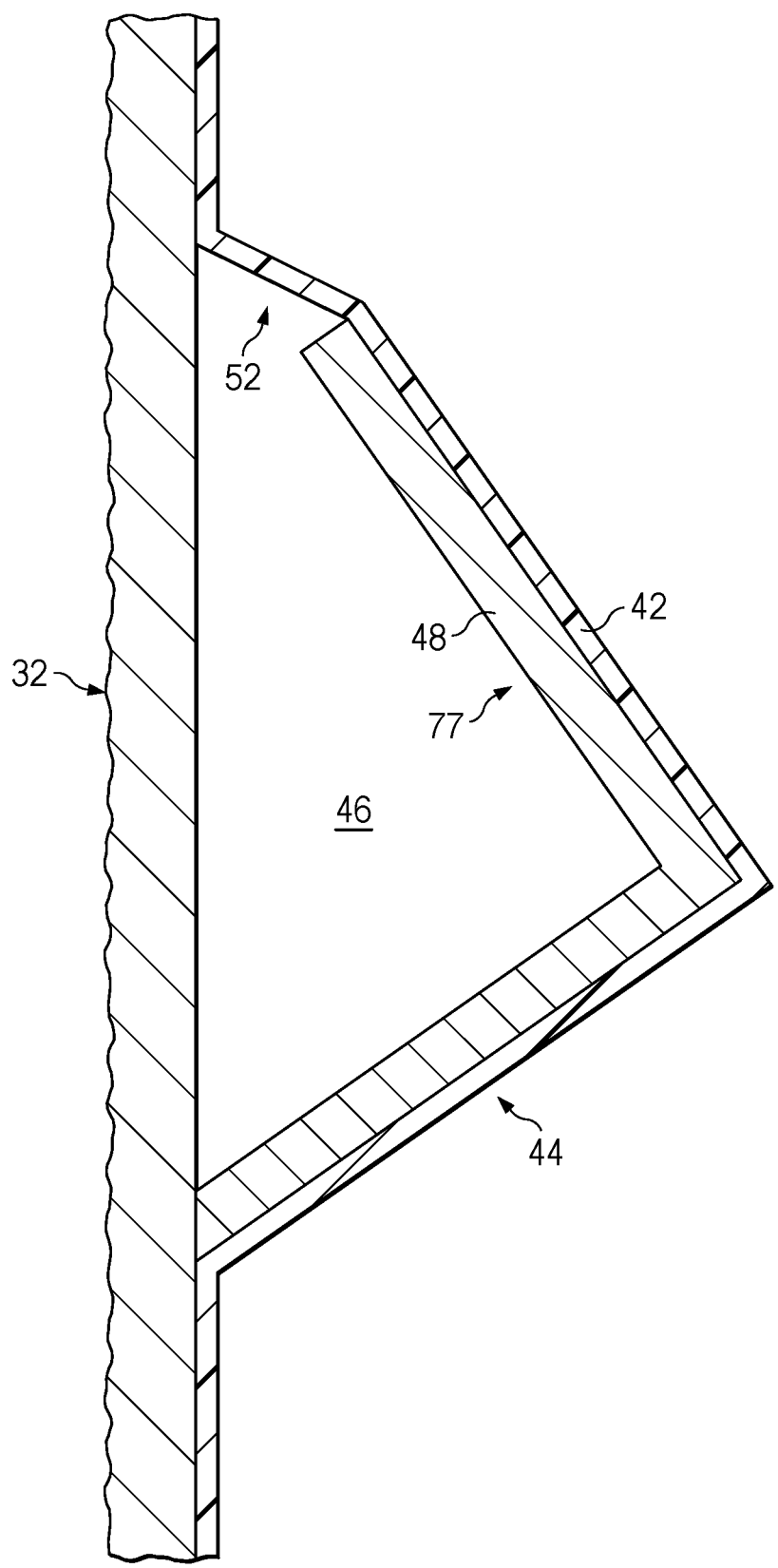
FIG. 8 is an illustration of a sectional view taken along the line 8-8 in FIG. 5, but also showing a vacuum bag having been installed.

Referring to FIGS. 6-8, each of the magnets 60 is configured to form and extends across the gap 61 (FIG. 7) between the channel member 48, 48a and the tool 32, contacting the tool 32 and thereby holding the channel member 48, 48a against the tool 32 through magnetic force. The spacers 58 are wedged within the channel members 48, 48a and may seat against the tool 32. As shown in FIG. 8, with the vacuum bag 42 installed, air and volatiles within the vacuum bag 42 flow through the vacuum bag 42 and into the passageway 46 via the air inlet 52 formed by the gap 61 between the channel member 48, 48a and the tool 32.

Figure 9:
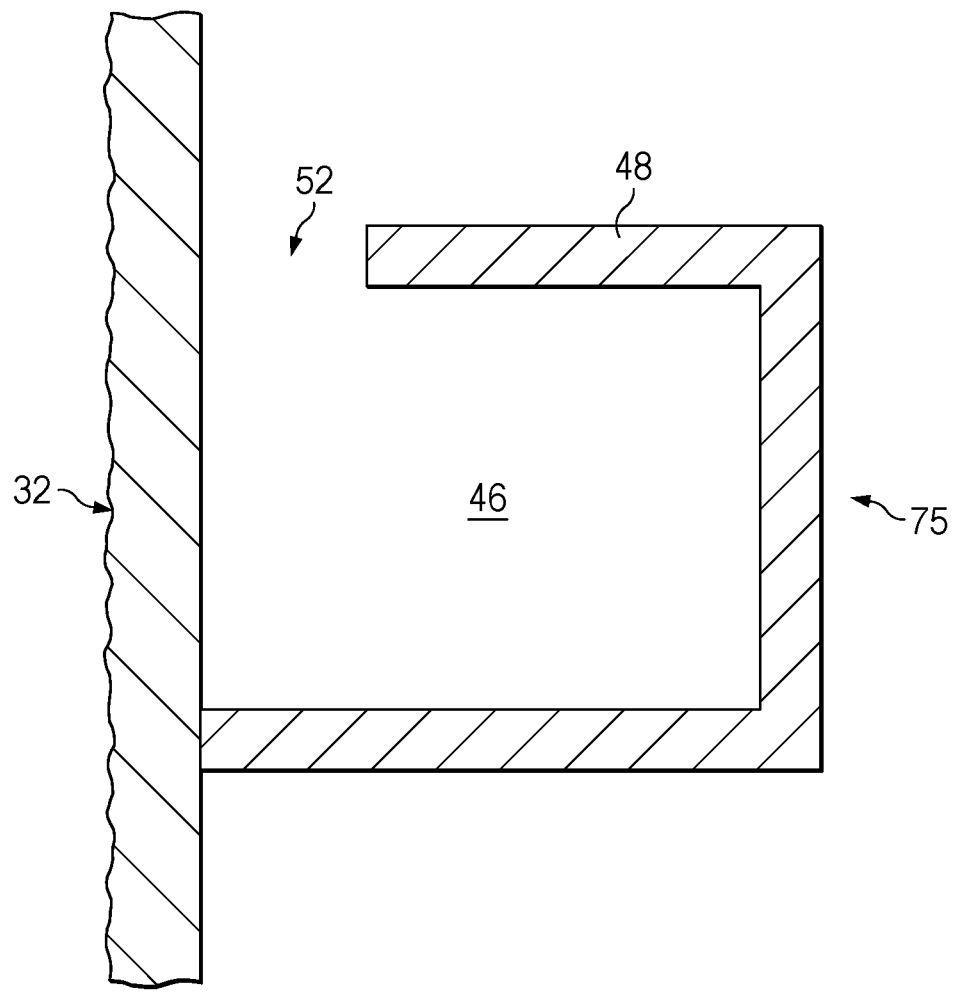
FIG. 9 is illustration of a cross-sectional view of another example of a breather.
Figure 10:
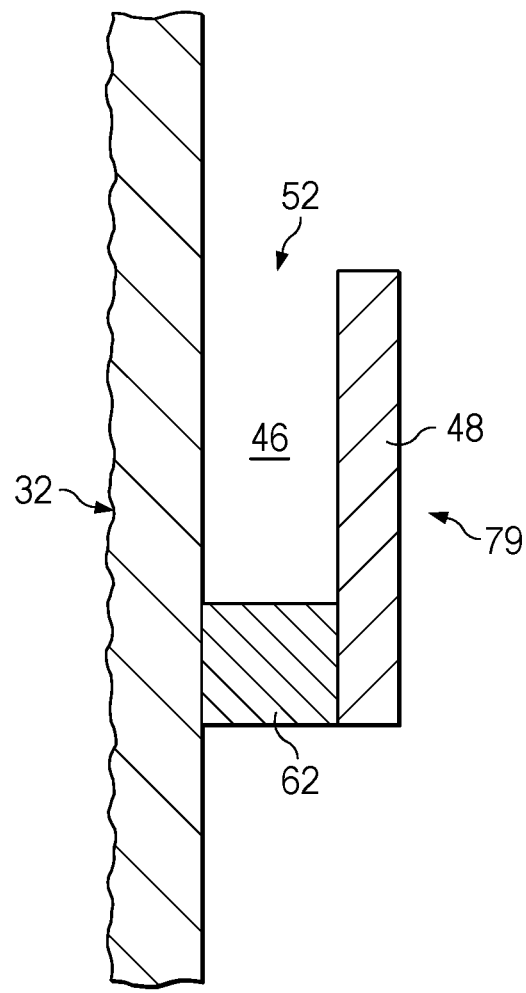
FIG. 10 is illustration of a cross-sectional view of another example of a breather.
Figure 11:
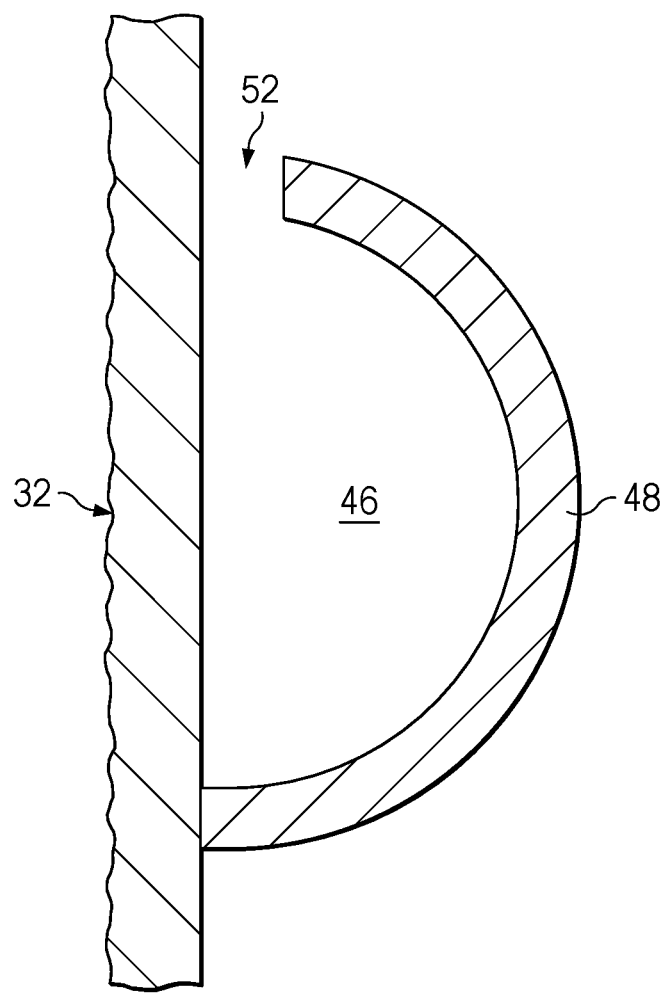
FIG. 11 is illustration of a cross-sectional view of another example of a breather.

In other examples, the channel member 48, 48a may have any of various cross-sectional shapes. For example, as shown in FIG. 9, the channel member 48, 48a may have a C-shape 75 provided with an air inlet 52 leading to the internal passageway 46. As shown in FIG. 10, the channel member 48, 48a may comprise a flat plate 79 from the tool 32 by a spacer 62 in order to form the internal passageway 46. FIG. 11 illustrates a channel member 48, 48a having a curved cross sectional shape.

Figure 12:
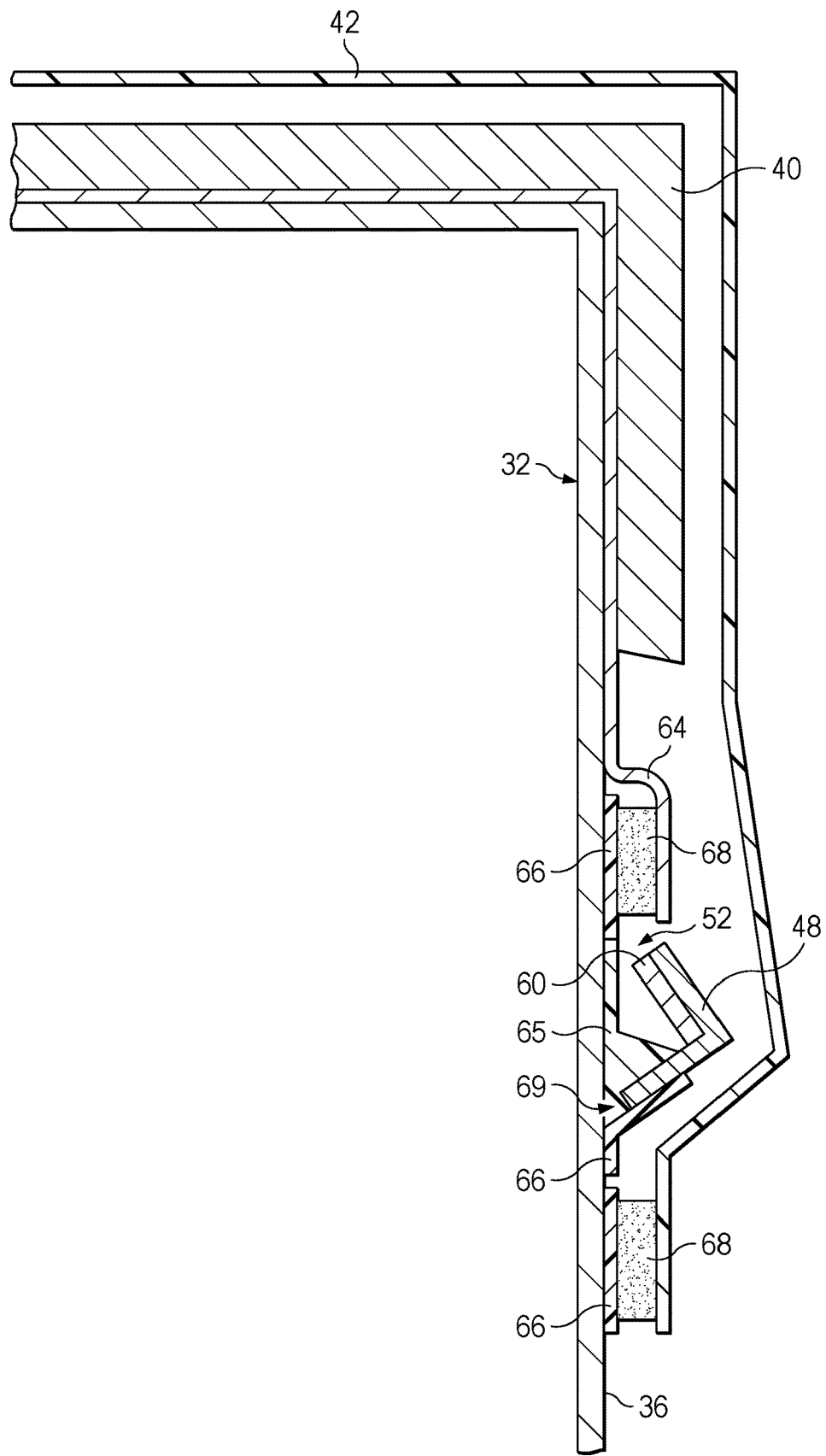
FIG. 12 is illustration of an exploded, cross-sectional view showing the components used to install and vacuum bag a part on the tool using the breather.

Attention is now directed to FIG. 12 which illustrates one practical implementation of the breather 44, in which the components of the vacuum bagging assembly are shown. A release film 64 between the tool 32 and the layup 40 extends down over and is adhered to a strip of tape 68 which is secured to a layer of film 66 on the tool 32. The vacuum bag 42 extends down over and below the channel member 48, 48a and is adhered to a strip of sealing tape 68, thereby sealing the vacuum bag 42 around its perimeter. Another film layer 66 beneath the sealing tape 68 extends upwardly to cover a joint 69 between the bottom of the channel member 48, 48a and the tool 32. Covering the joint 69 with the film layer 66 prevents the vacuum bag 42 from being drawn into the joint 69. A layer 65 of protective material such as a coated fiberglass may be placed against the tool 32 beneath the channel member 48, 48a to protect the surface of the tool 32 from scratching or other damage caused by the channel member 48, 48a.

Figure 13:
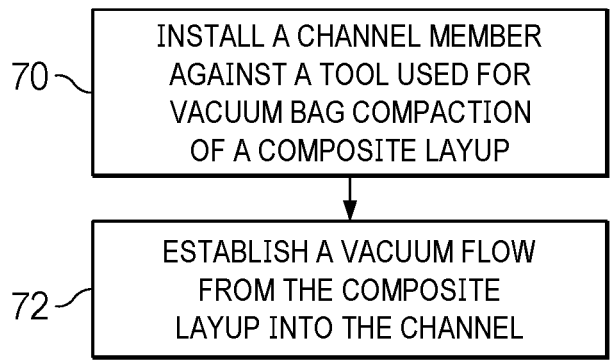
FIG. 13 is an illustration of a method of installing a semi-permanent breather on a compaction tool.

FIG. 13 broadly illustrates the steps of a method of installing a semi-permanent breather on a compaction tool. Beginning at 70, a channel member 48, 48a is installed against a tool 32 used for vacuum bag compaction of the composite layup. At 72, a vacuum flow is established from the composite layup into the channel.

Figure 14:
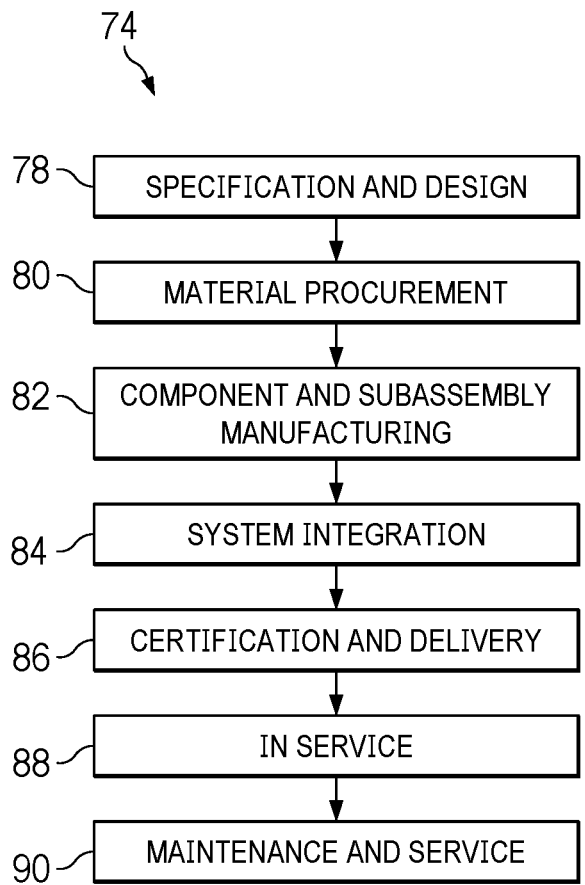
FIG. 14 is an illustration of a flow diagram of aircraft production and service methodology.
Figure 15:
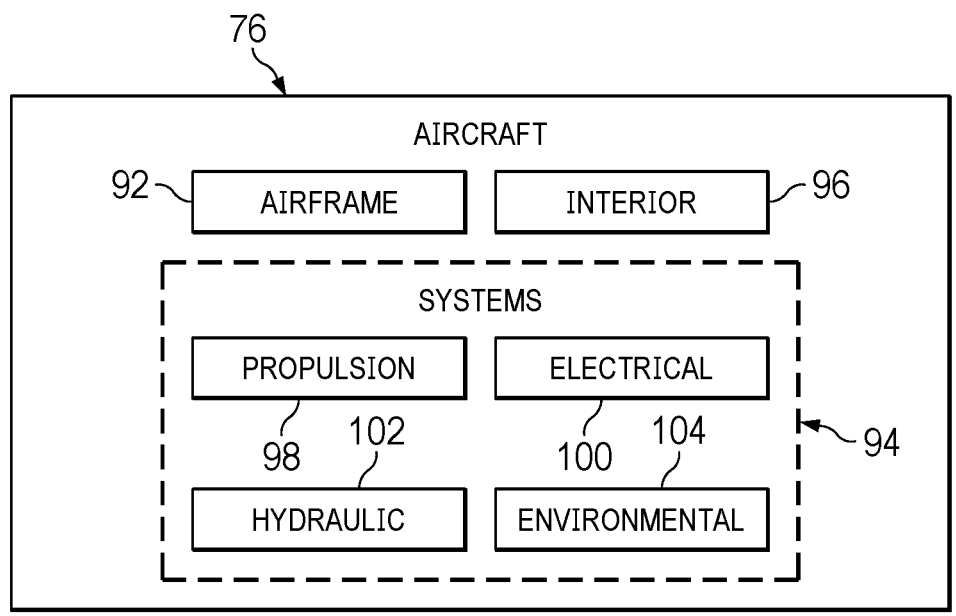
FIG. 15 is an illustration of a block diagram of an aircraft.

Examples of the disclosure may find use in a variety of potential applications, particularly in the transportation industry, including for example, aerospace, marine, automotive applications and other application where composite layups are compacted using vacuum bags. Thus, referring now to FIGS. 14 and 15, examples of the disclosure may be used in the context of an aircraft manufacturing and service method 74 as shown in FIG. 14 and an aircraft 76 as shown in FIG. 15. Aircraft applications of the disclosed examples may include a variety of composite laminate parts that are compacted using a vacuum bag. During pre-production, the method 74 may include specification and design 78 of the aircraft 76 and material procurement 80. During production, component and subassembly manufacturing 82 and system integration 84 of the aircraft 76 takes place. Thereafter, the aircraft 76 may go through certification and delivery 86 in order to be placed in service 88. While in service by a customer, the aircraft 76 is scheduled for routine maintenance and service 90, which may also include modification, reconfiguration, refurbishment, and so on.

Each of the processes of method 74 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 76 produced by method 74 may include an airframe 92 with a plurality of high level systems 94 and an interior 96. Examples of high-level systems 130 include one or more of a propulsion system 98, an electrical system 100, a hydraulic system 102 and an environmental system 104. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 74. For example, components or subassemblies corresponding to component and subassembly manufacturing 82 may be fabricated or manufactured in a manner similar to components or subassemblies produced while the aircraft 76 is in service. Also, one or more apparatus examples, method examples, or a combination thereof may be utilized during the component and subassembly manufacturing 82 and system integration 84, for example, by substantially expediting assembly of or reducing the cost of an aircraft 76. Similarly, one or more of apparatus examples, method examples, or a combination thereof may be utilized while the aircraft 76 is in service, for example and without limitation, to maintenance and service 90.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method, comprising: placing a composite layup on a tool; installing a vacuum bag breather on the tool comprising: installing a channel member against the tool using at least one magnet; placing a vacuum bag over the vacuum bag breather, the composite layup and the channel member; sealing the vacuum bag to the tool; and establishing a vacuum flow from the composite layup into the channel member.

2. The method of claim 1, further comprising the at least one magnet including a plurality of magnets, wherein installing the channel member includes releasably attaching the channel member to the tool using the plurality of magnets to hold the channel member against surfaces of the tool.

3. The method of claim 2, wherein installing the channel member includes using the magnets to space the channel member away from the tool and form an air inlet between the channel member and the tool.

4. The method of claim 1, further comprising: detecting vacuum leaks by monitoring a change in vacuum pressure at a distal end of the channel member, wherein the distal end is located away from a vacuum port in the tool.

5. The method of claim 1, wherein installing the channel member includes positioning the channel member over a vacuum port in the tool.

6. The method of claim 1, further comprising: the channel member comprising a plurality of channel members; and installing the plurality of channel members against the tool, including arranging the plurality of channel members end-to-end along the tool.

7. The method of claim 1, wherein installing the channel member against the tool is performed without modifying the tool.

8. A method, comprising:
placing a composite layup on a tool;
installing a vacuum bag breather on the tool comprising:
    installing a channel member against the tool using at least one magnet;
placing a vacuum bag over the vacuum bag breather, the composite layup and the channel member;
sealing the vacuum bag to the tool;
establishing a vacuum flow from the composite layup into the channel member; and
compacting the composite layup.

9. The method of claim 8, further comprising the at least one magnet comprising a plurality of magnets, wherein installing the channel member includes releasably attaching the channel member to the tool using the plurality of magnets to hold the channel member against surfaces of the tool.

10. The method of claim 9, wherein installing the channel member includes using the magnets to space the channel member away from the tool and form an air inlet between the channel member and the tool.

11. The method of claim 8, further comprising: detecting vacuum leaks by monitoring a change in vacuum pressure at a distal end of the channel member, wherein the distal end is located away from a vacuum port in the tool.

12. The method of claim 8, wherein installing the channel member includes positioning the channel member over a vacuum port in the tool.

13. The method of claim 8, further comprising: the channel member comprising a plurality of channel members; and installing the plurality of channel members against the tool, including arranging the plurality of channel members end-to-end along the tool.

14. The method of claim 8, wherein installing the channel member against the tool is performed without modifying the tool.

15. A method, comprising:
placing a composite layup on a tool;
installing a vacuum bag breather on the tool comprising:
    installing a channel member against the tool using at least one magnet;
placing a vacuum bag over the vacuum bag breather, the composite layup and the channel member;
sealing the vacuum bag to the tool;
establishing a vacuum flow from the composite layup into the channel member;
compacting the composite layup;
terminating the vacuum flow; and
removing from the tool both the vacuum bag and the composite layup.

16. The method of claim 15, further comprising: the channel member comprising a plurality of channel members;

and installing the plurality of channel members against the tool, including arranging the plurality of channel members end-to-end along the tool.

17. The method of claim 16, wherein installing the channel member includes using the magnets to space the channel member away from the tool and form an air inlet between the channel member and the tool.

18. The method of claim 15, further comprising: detecting vacuum leaks by monitoring a change in vacuum pressure at a distal end of the channel member, wherein the distal end is located away from a vacuum port in the tool.

19. The method of claim 15, wherein installing the channel member includes positioning the channel member over a vacuum port in the tool.

20. The method of claim 15, further comprising: the channel member comprising a plurality of channel members; and installing the plurality of channel members against the tool, including arranging the plurality of channel members end-to-end along the tool.

21. The method of claim 15, wherein installing the channel member against the tool is performed without modifying the tool.

22. The method of claim 3, wherein a location of the air inlet is adjacent to where a portion of a release film is sealed to the tool.

23. The method of claim 10, wherein a location of the air inlet is adjacent to where a portion of a release film is sealed to the tool.

24. The method of claim 17, wherein a location of the air inlet is adjacent to where a portion of a release film is sealed to the tool.

* * * * *